UNITED STATES PATENT OFFICE.

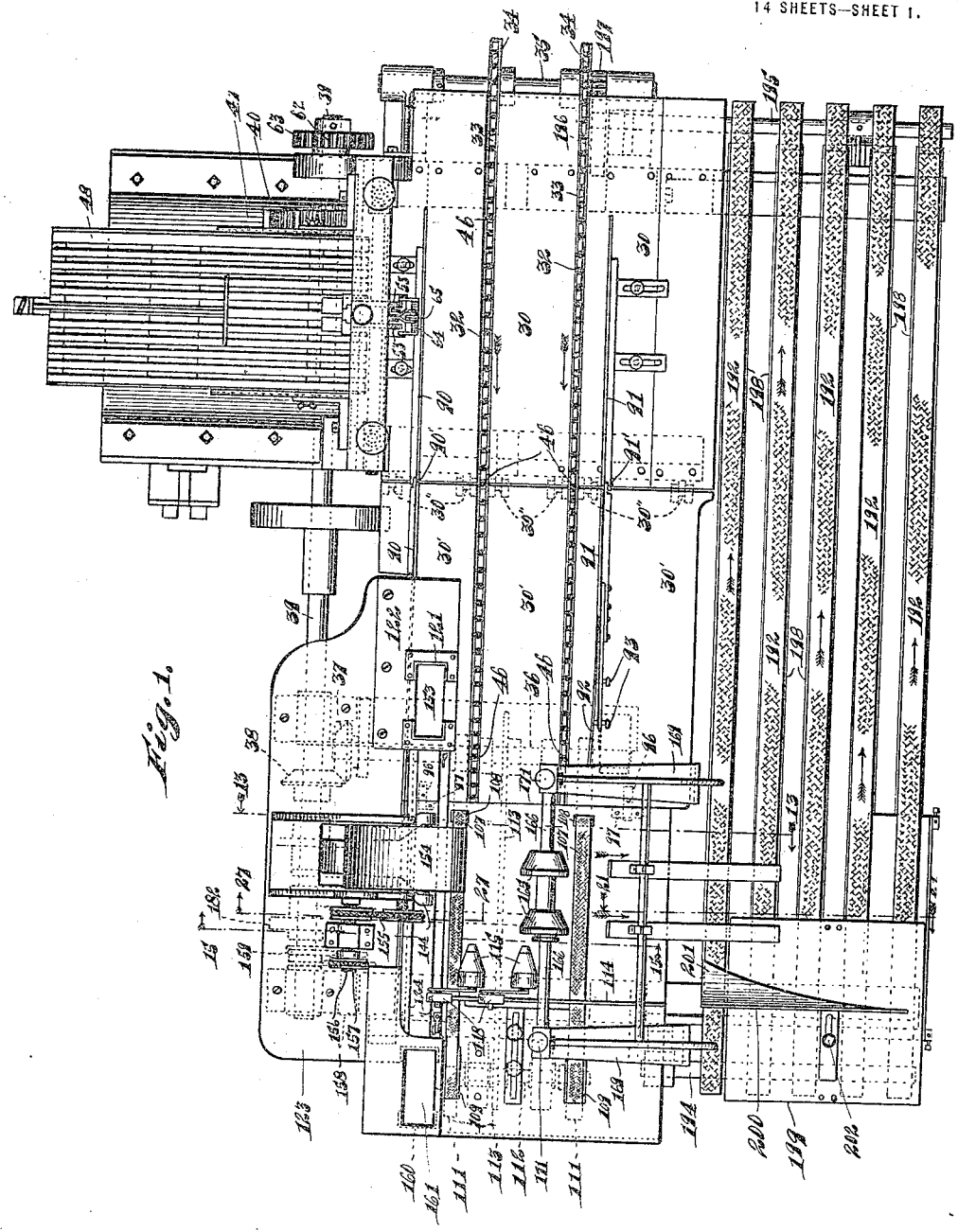

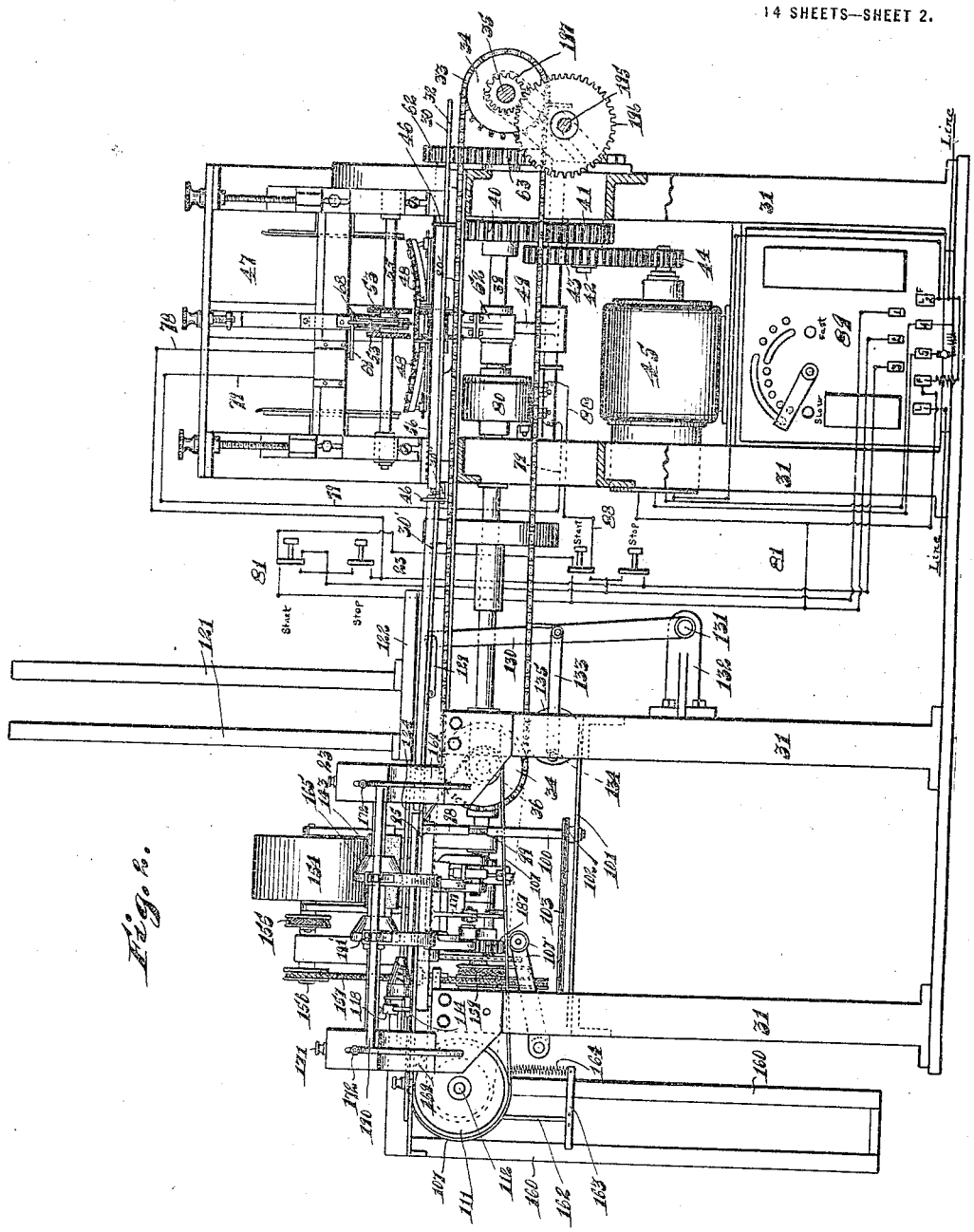

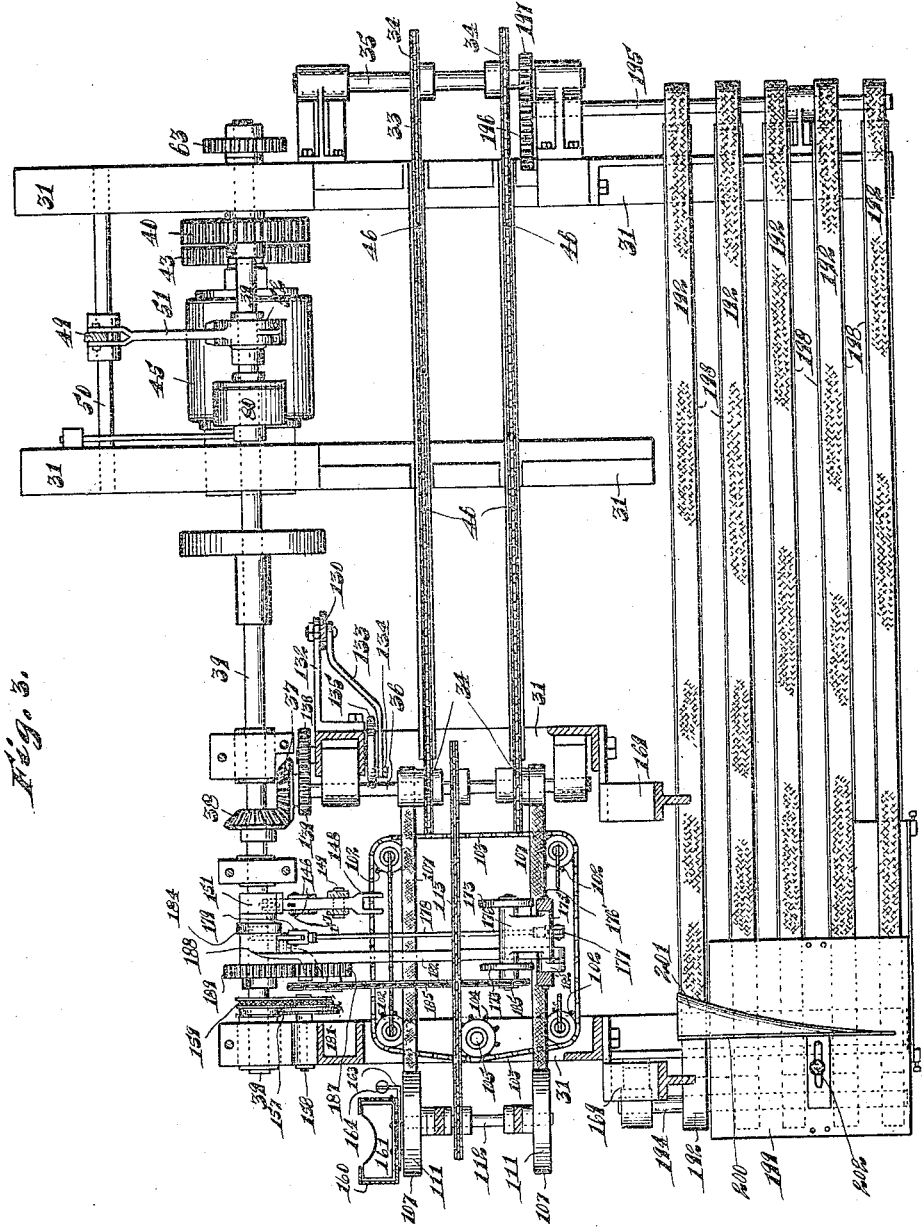

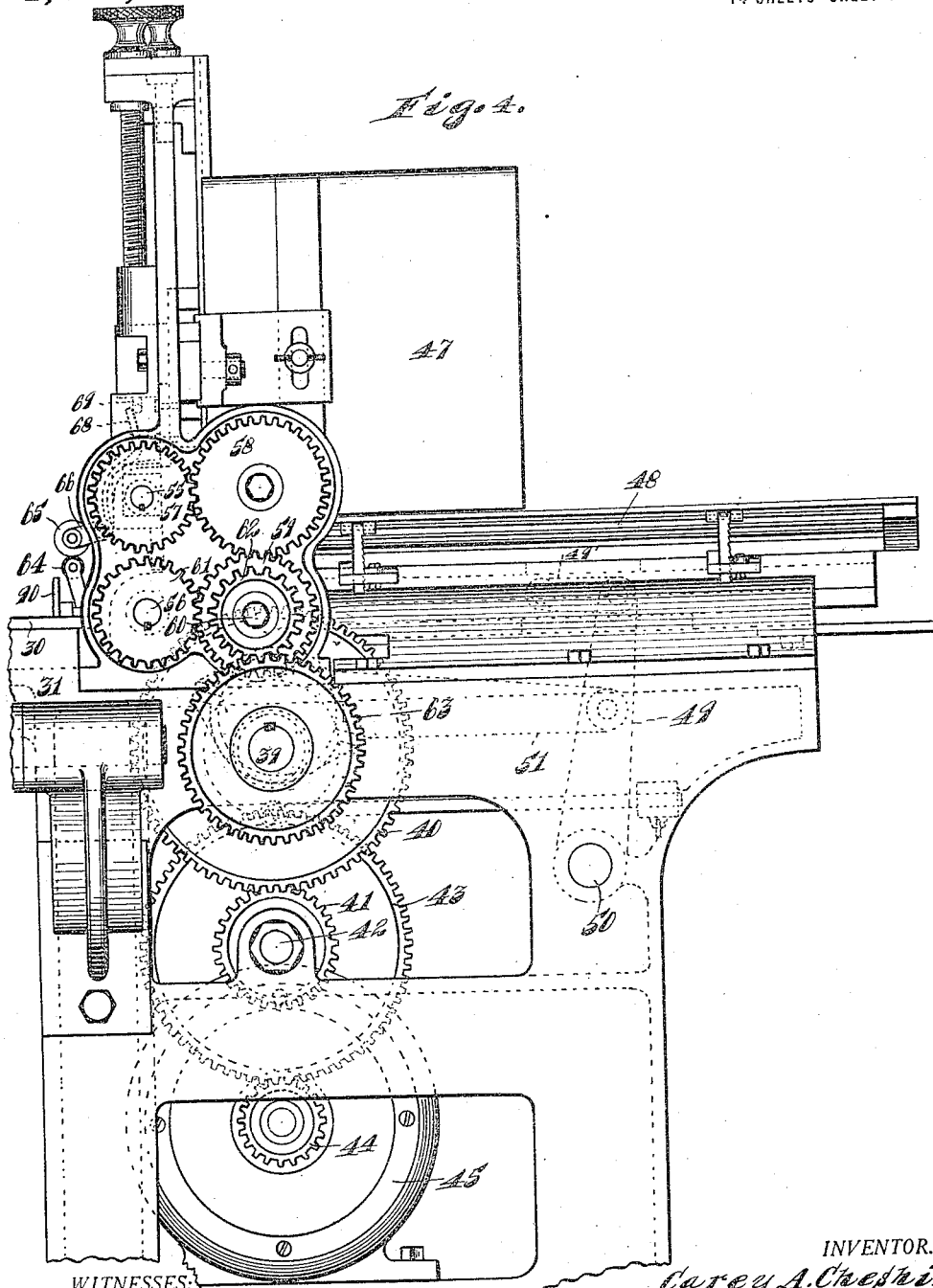

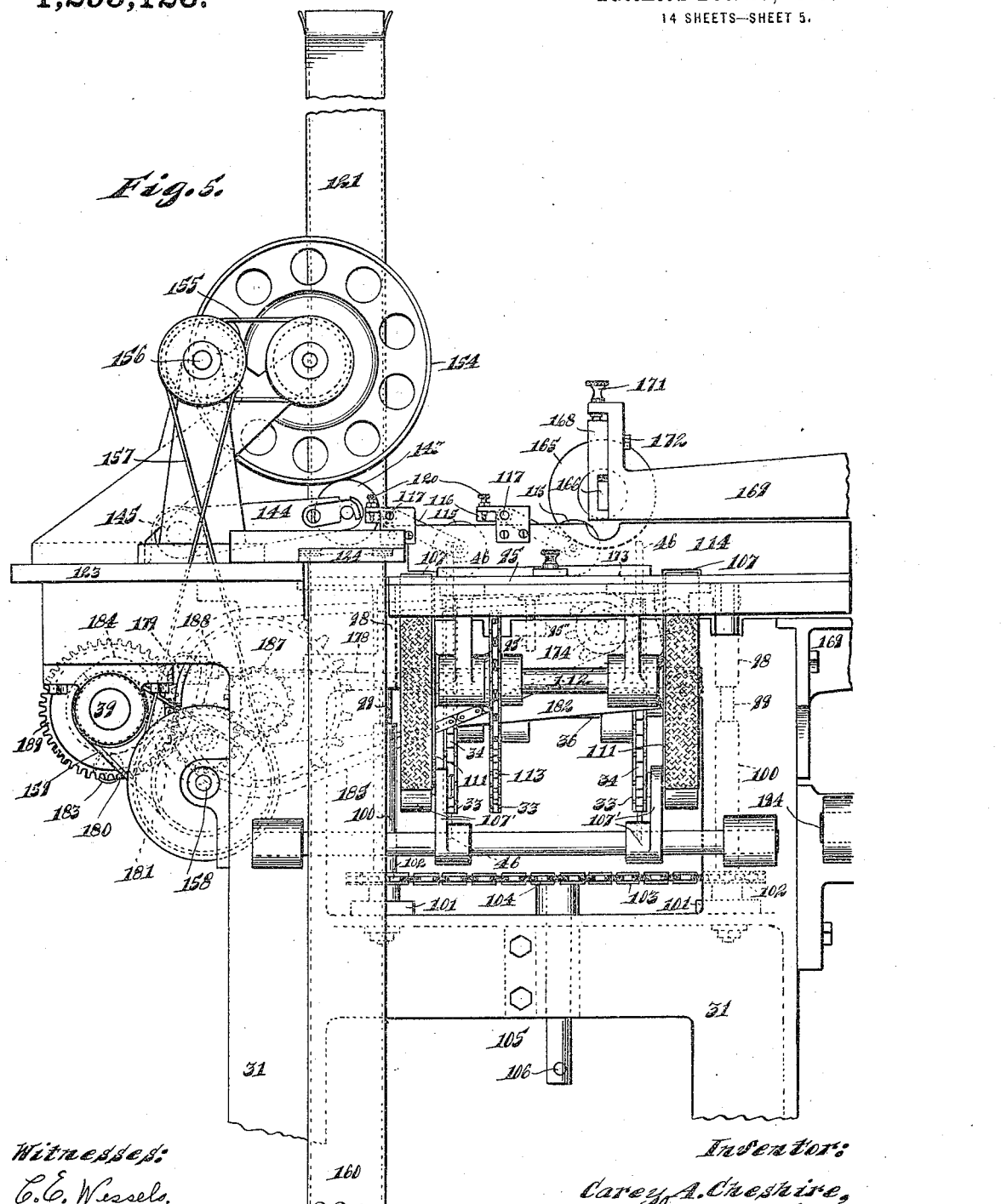

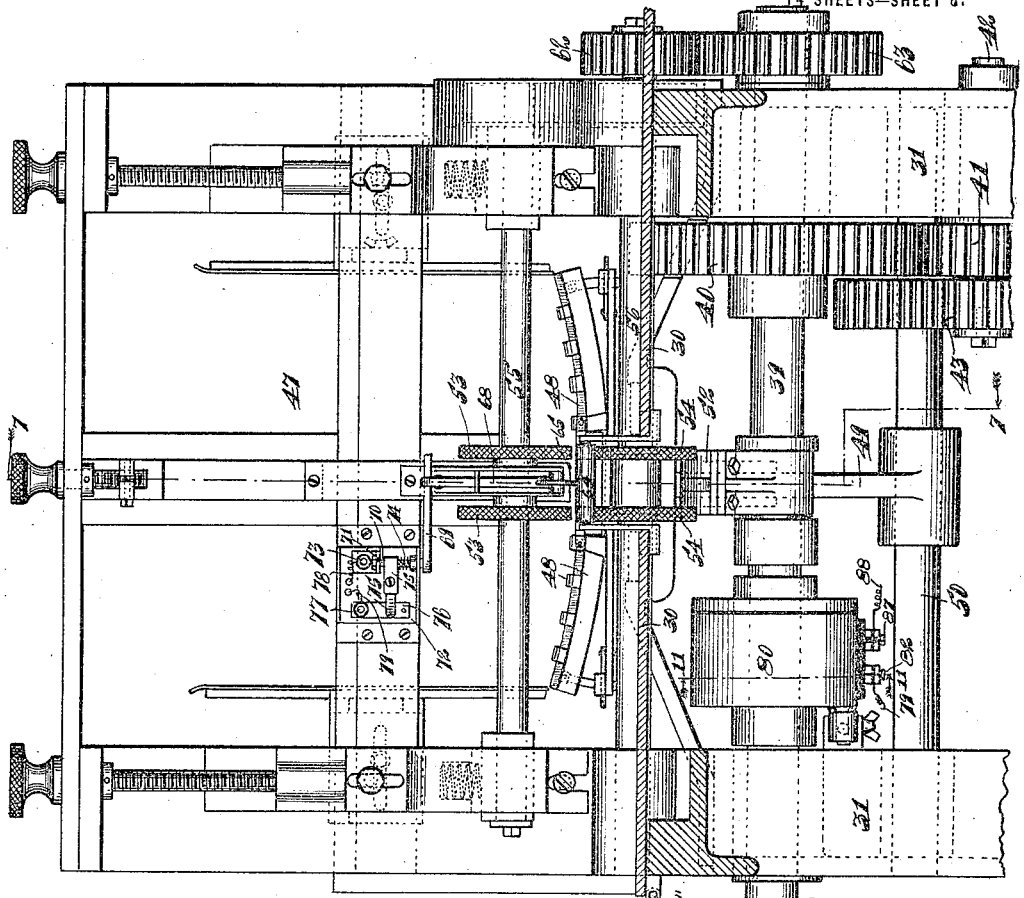

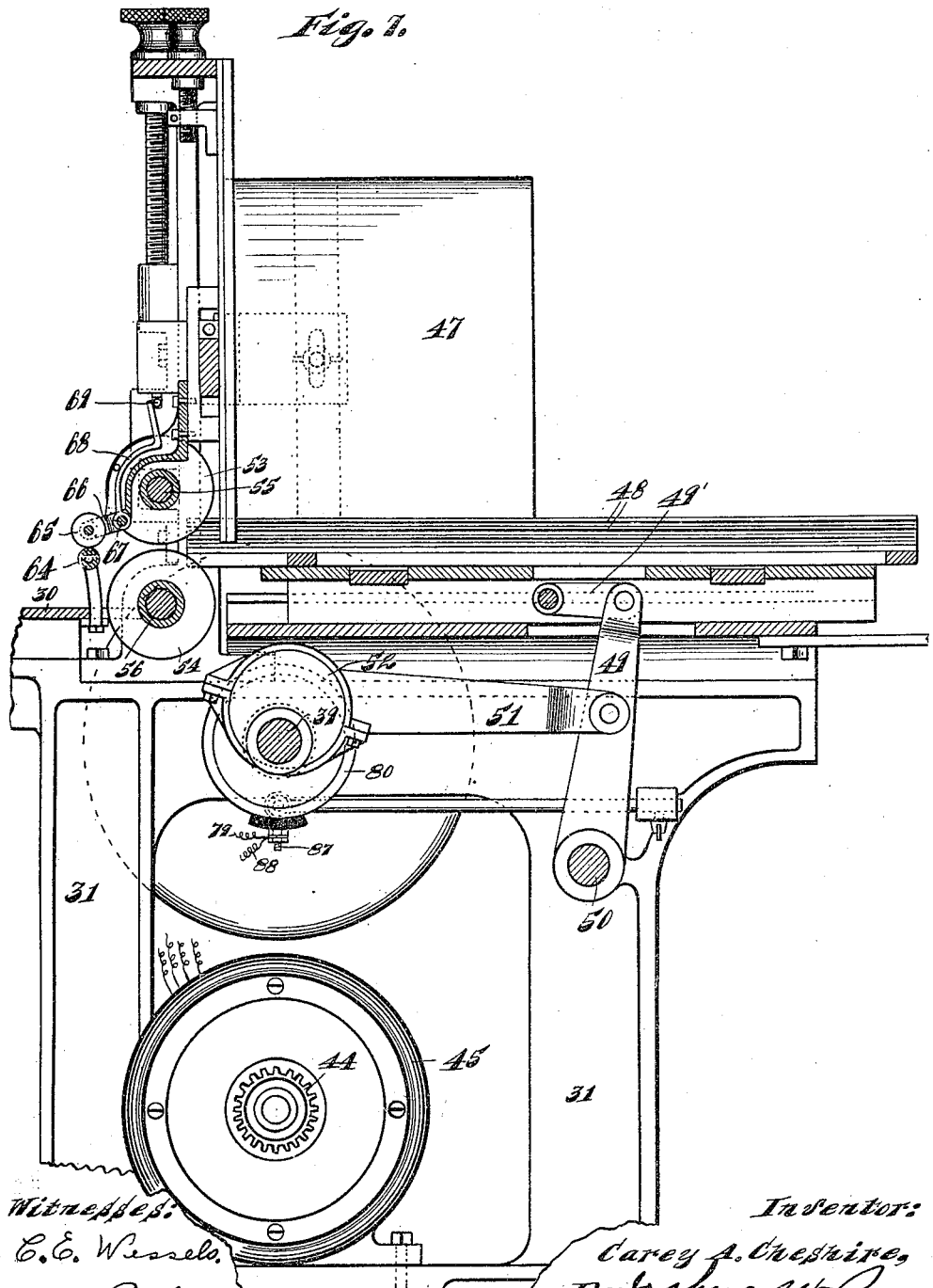

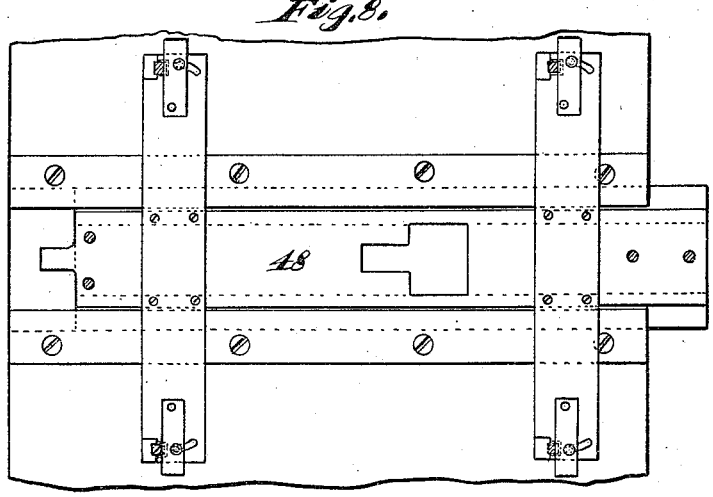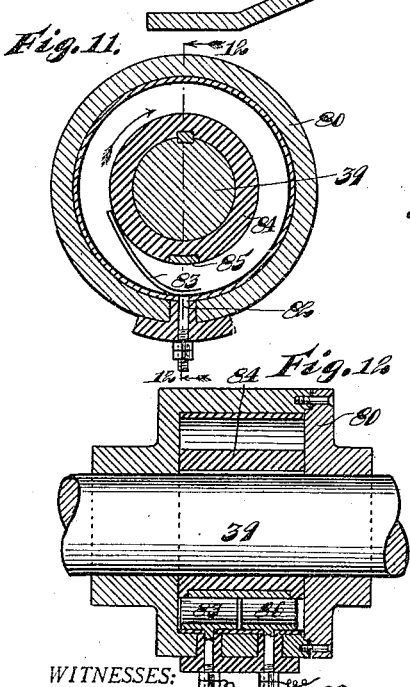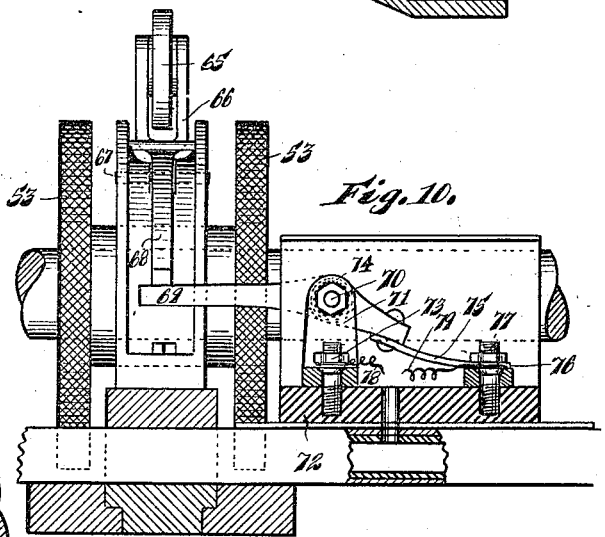

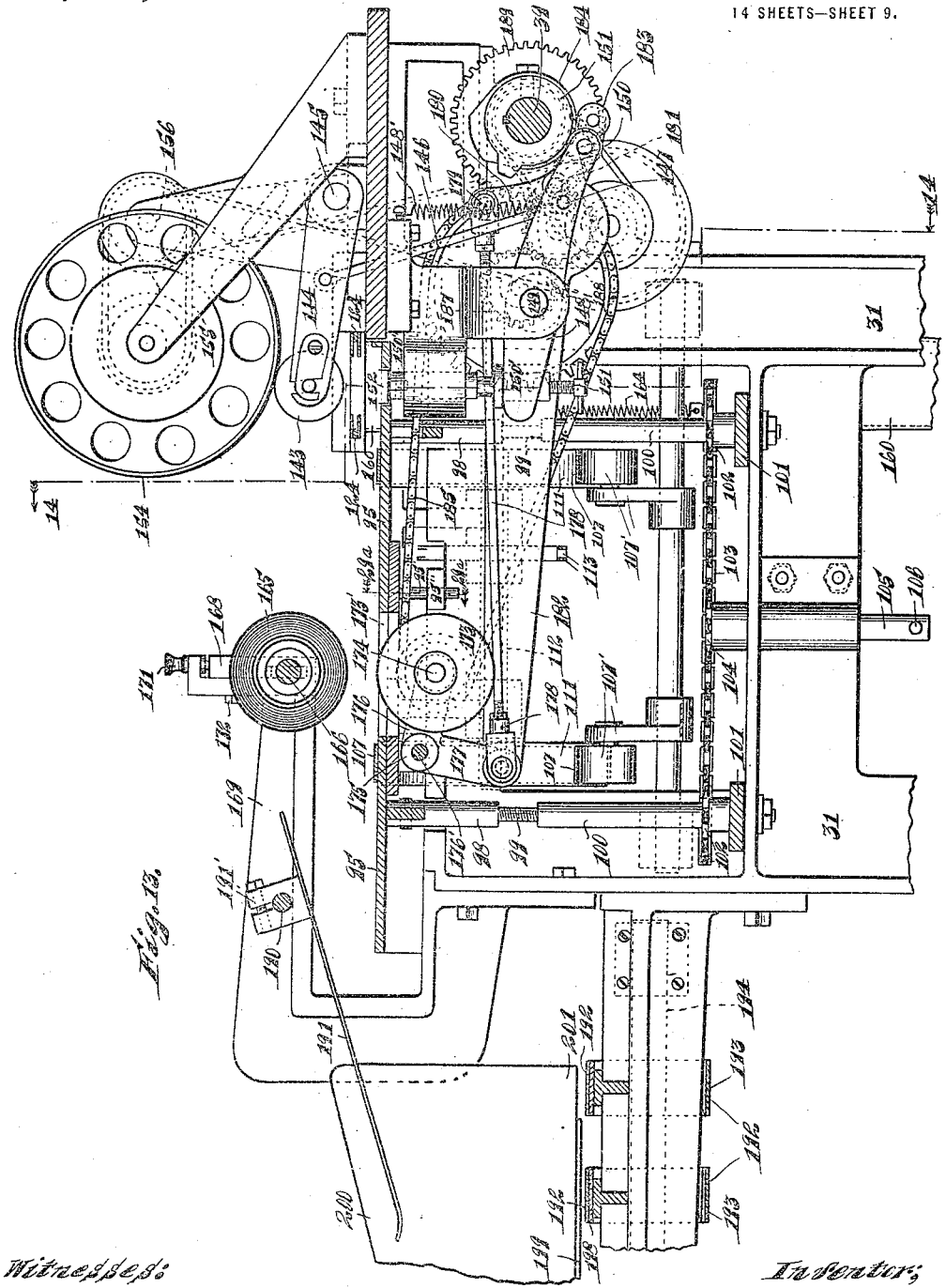

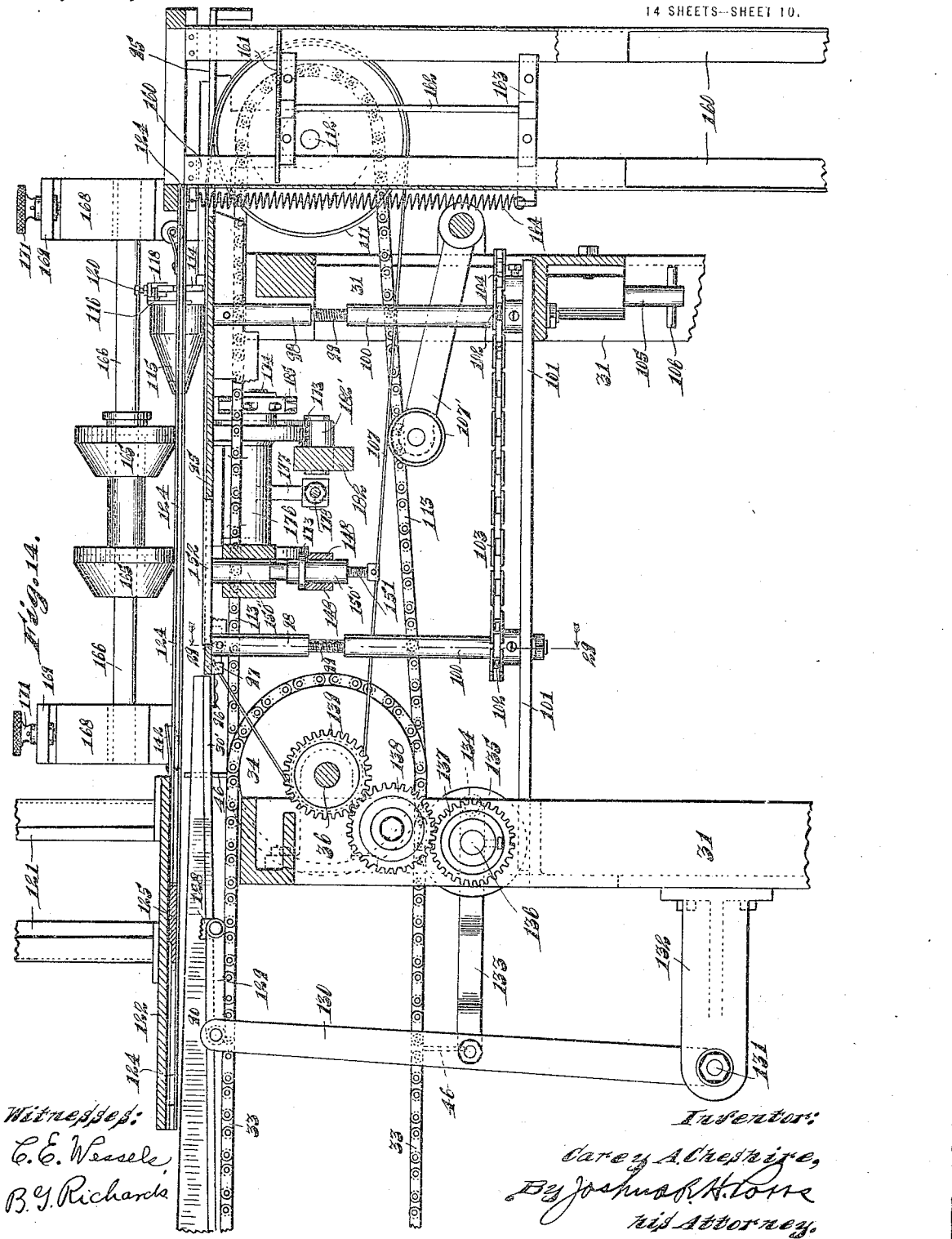

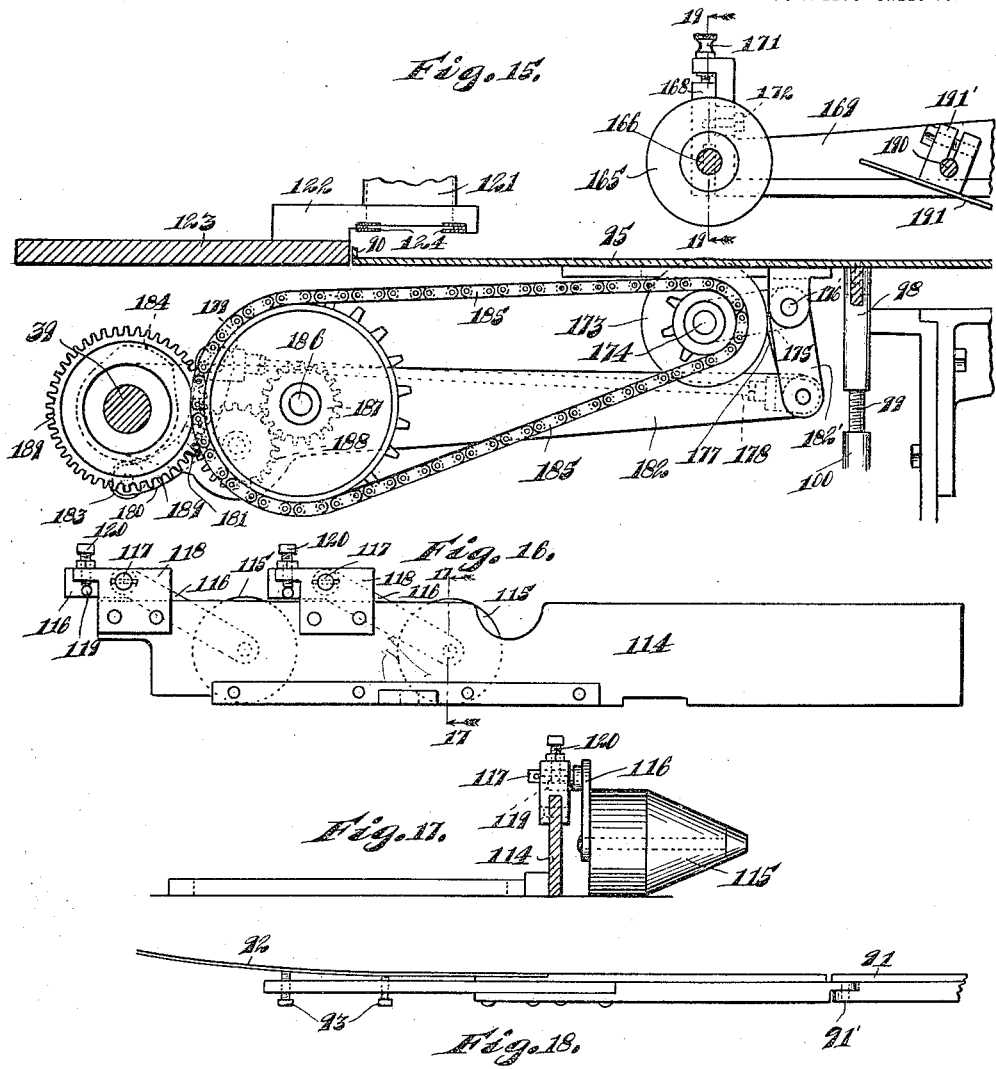

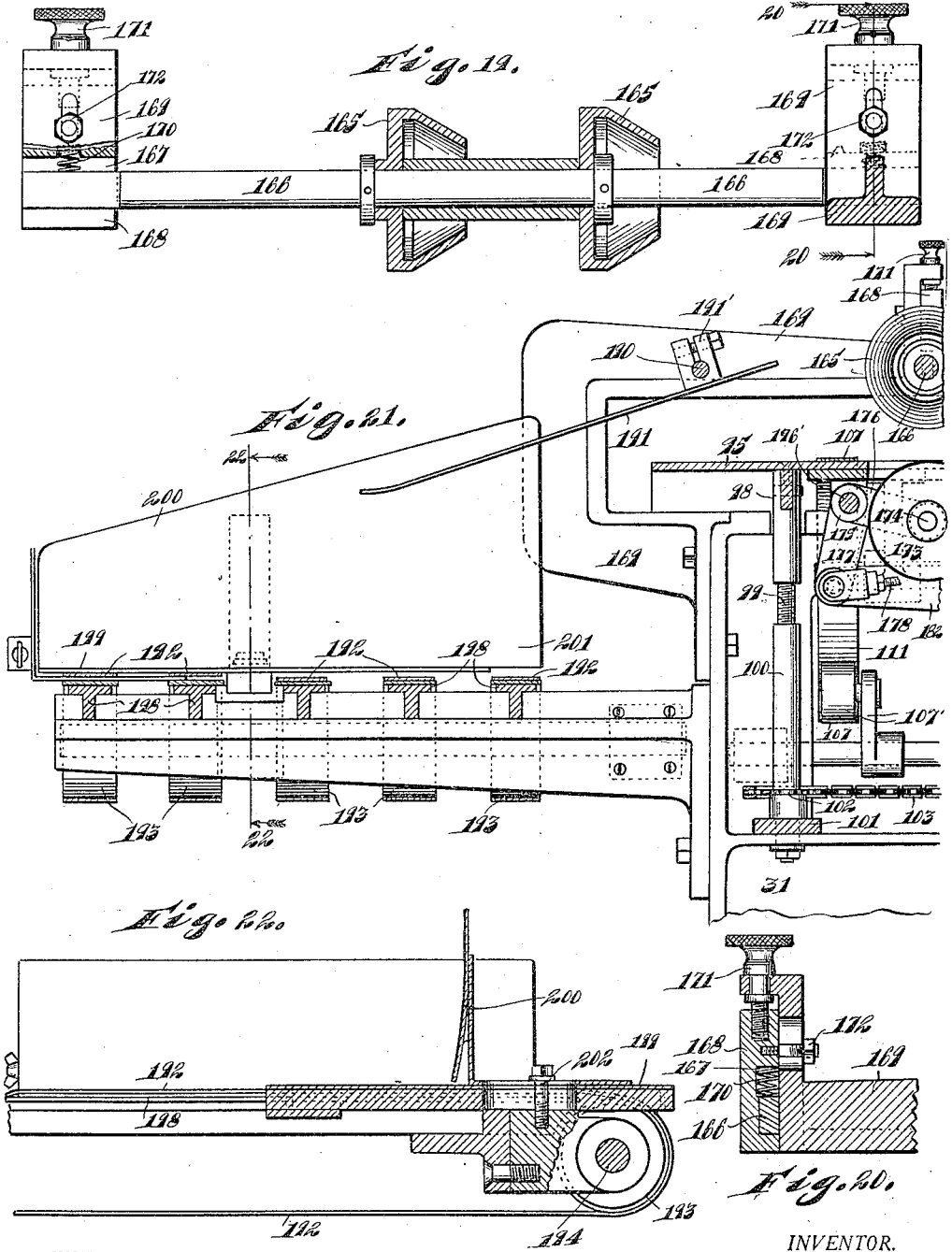

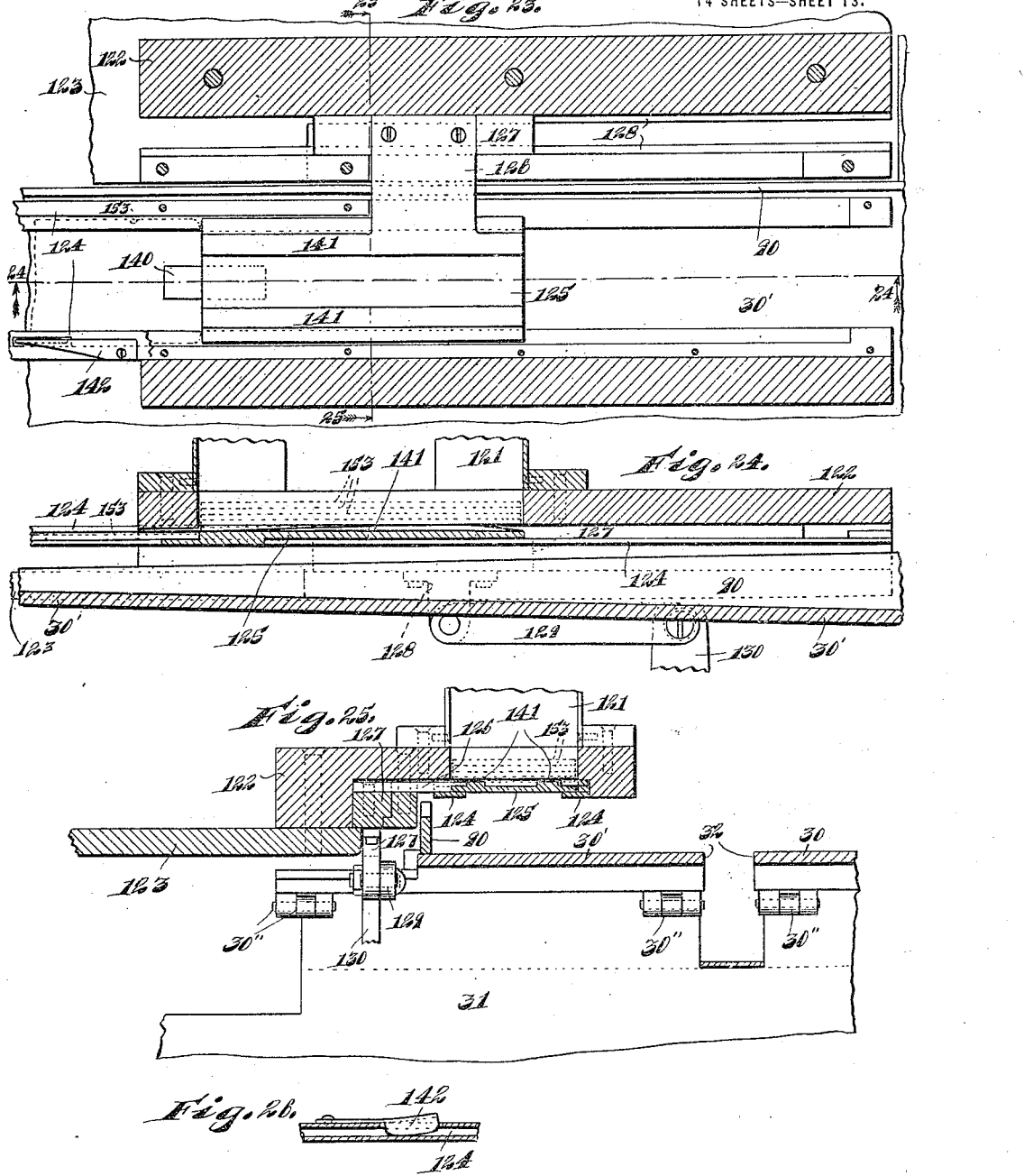

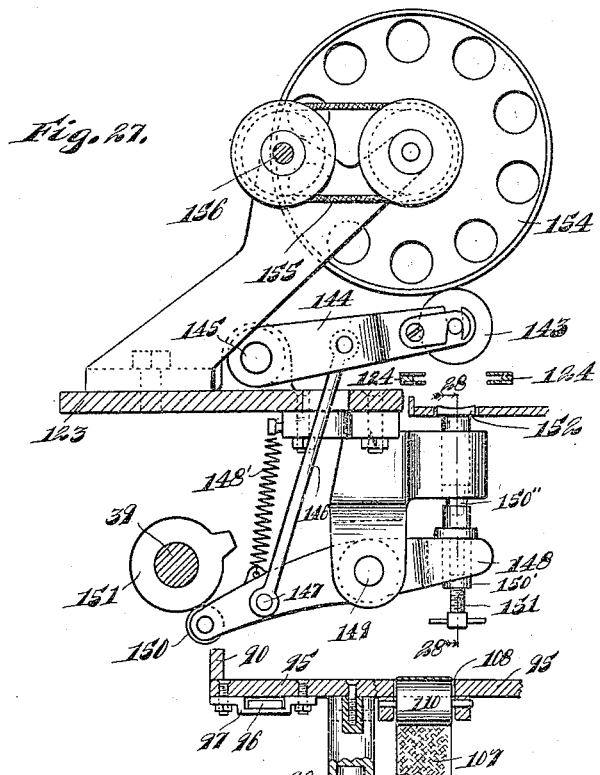

CAREY A. CHESHIRE, OF CHICAGO, ILLINOIS; MILTON F. CHESHIRE, ADMINISTRATOR OF SAID CAREY A. CHESHIRE, DECEASED, ASSIGNOR TO THOMAS A. CHESHIRE, OF DES MOINES, IOWA.

ADDRESSING-MACHINE.

1,295,123.                        Specification of Letters Patent.         Patented Feb. 25, 1919.

Application filed January 19, 1917. Serial No. 143,350.

*To all whom it may concern:*

Be it known that I, CAREY A. CHESHIRE, a citizen of the United States, and a resident of the city of Chicago, county of Cook and State of Illinois, have invented certain new and useful Improvements in Addressing-Machines, of which the following is a specification.

My invention relates to improvements in addressing machines, and has for its object the provision of an improved machine of this character which is simple and efficient in operation, and occupies comparatively little floor space.

The invention consists in the combinations and arrangements of parts hereinafter described and claimed.

The invention will be best understood by reference to the accompanying drawings forming a part of this specification, and in which, Figure 1 is a top plan view of a machine embodying my invention, Fig. 2, a front elevation of the same, with parts removed, Fig. 3, a horizontal section of the same, Fig. 4, an enlarged partial end view of the machine, Fig. 5, an enlarged partial view of the end opposite to that shown in Fig. 4, Fig. 6, an enlarged partial longitudinal section of the machine, Fig. 7, a section taken on line 7—7 of Fig. 6, Fig. 8, a horizontal section taken just below a reciprocating feed plate employed in the machine, Fig. 9, a transverse view taken through said feed plate, Fig. 10, an enlarged detail section of mechanism employed for stopping the machine, Fig. 11, a section taken on line 11—11 of Fig. 6, Fig. 12, a section taken on line 12—12 of Fig. 11, Fig. 13, an enlarged section taken on line 13—13 of Fig. 1, Fig. 14, a section taken on line 14—14 of Fig. 13, Fig. 15, an enlarged section taken on line 15—15 of Fig. 1, Fig. 16, an enlarged detail view of a stop member employed in the machine, Fig. 17, a section taken on line 17—17 of Fig. 16, Fig. 18, an enlarged top plan view of a spring guide member employed in the machine, Fig. 19, an enlarged section taken on line 19—19 of Fig. 15, Fig. 20, a section taken on line 20—20 of Fig. 19, Fig. 21, an enlarged detail section taken on line 21—21 of Fig. 1, Fig. 22, a section taken on line 22—22 of Fig. 21, Fig. 23, an enlarged horizontal section taken through the lower portion of a stencil holder employed in the machine, Fig. 24, a section taken on line 24—24 of Fig. 23, Fig. 25, a section taken on line 25—25 of Fig. 23, Fig. 26, an enlarged detail view of a frictional contact member employed in stencil feeding apparatus employed in the machine, Fig. 27, a section taken on line 27—27 of Fig. 1.

Fig. 28, an enlarged section taken on line 28—28 of Fig. 27,

Fig. 29, a section taken on line 29—29 of Fig. 14, and

Fig. 29$^a$, a section taken on line 29$^a$—29$^a$ of Fig. 13.

The preferred form of construction, as illustrated in the drawings, comprises a suitable feed table formed of two sections 30 and 30′, the section 30 being supported on suitable legs or standards 31, and the section 30′ being hinged to section 30 at the points 30″, as best indicated in Figs. 1 and 2. The feed table 30—30′ is provided with two longitudinal slots 32 extending throughout its length and sprocket chains 33 are arranged in the frame of the machine to travel under said slots, said sprocket chains being arranged to travel over sprockets 34 fixed to the shafts 35 and 36, as indicated. Shaft 36 carries a bevel gear 37 meshing with a bevel gear 38 on shaft 39 which is the main power shaft of the machine. As best shown in Fig. 4, shaft 39 carries a gear 40 meshing with a pinion 41 on a shaft 42, carrying a gear 43 meshing with a pinion 44 driven by an ordinary electric motor 45, mounted in the frame of the machine. The chains 33 are provided with transversely alining upstanding feed pins 46 projecting upwardly through slots 32 and serving to feed articles, such as magazines, along the feed table 30—30', as will be readily understood.

As best shown in Figs. 1, 2, 6 and 7, a magazine feed hopper 47 is arranged at the rear of table portion 30 and is provided with a reciprocating feed plate 48 operatively connected with the upper end of a rocker arm 49 by means of a link 49'. Rocker arm 49 is pivoted to the frame of the machine at 50 and is operated by means of a connecting rod 51 from an eccentric 52 on shaft 39. The arrangement is such that at each revolution of shaft 39, the plate 48 will be caused to perform a complete reciprocation to feed the bottommost of a pile of magazines forwardly from the hopper 47.

As best shown in Figs. 6, 7 and 10, feed rollers 53 and 54 are arranged to coöperate with plate 48, said feed rollers being mounted respectively on feed shafts 55 and 56. Shaft 55 carries a pinion 57 meshing with a gear 58 meshing with a gear 59 on a shaft 60. Gear 59 meshes with a pinion 61 on shaft 56 and shaft 60 also carries a pinion 62 meshing with a gear 63 on shaft 39, the gearing being such as to operate the feed rollers 53 and 54 to feed out the magazines projected by plate 48 onto the table section 30, and the parts are so timed as to effect such feeding to cause the magazines to fall between the feed pins 46 on the chains 33 to be fed along the feed table.

As best shown in Figs. 4, 6, 7 and 10, a guide roller 64, of insulating material, is arranged just forward of the feed rollers 53—54 to coöperate with a riding roller 65 arranged to ride upon the magazines projected from hopper 47, but to rest upon the roller 64 in the absence of such a magazine. The riding roller 65 is carried by a bifurcated rocker arm 66 mounted upon a shaft 67 located just below and outside of shaft 55 and carrying an upwardly extending operating finger 68 resting against the outer face of a rocker arm 69. Rocker arm 69 is fixed to a rocker shaft 70 mounted in a bracket 71 fixed to a block 72 of insulating material on the frame of the machine. Bracket 71 carries a binding post 73, and shaft 70 is equipped with a torsional spring 74 arranged to hold a spring rocker arm 75 thereon in contact with a conductor plate 76 electrically connected with a binding post 77 on block 72. Electric wires 78 and 79 are connected respectively with binding posts 73 and 77, the wire 79 leading to a casing 80, and the wire 78 leading to an ordinary controlling circuit 81 for the electric motor 45.

As best shown in Figs. 11 and 12, the wire 79 is connected with a binding post 82 on casing 80, said binding post being, in turn, connected with a leaf spring 83 riding on the periphery of a roller 84 of insulating material fixed to shaft 39. Roller 84 carries a contact plate 85 embedded therein and arranged to connect leaf spring 83 with a companion leaf spring 86 riding upon roller 84 and electrically connected with a binding post 87 on casing 80. Binding post 87 is connected, by means of a wire 88, with the starting circuit 81, the arrangement being such that, through the ordinary starting box 89 and the circuit 81, the electric motor 45 and the machine may be started and stopped, as desired. However, the roller 84 is so timed that, upon the forward motion of the plate 48, when a magazine should be present between the rollers 64 and 65, the plate 85 closes the connection between leaf springs 83 and 86, so that if, at this time, the roller 65 is not riding upon a magazine, as it should be, but has dropped down permitting the closing of the circuit between binding posts 73 and 77, a circuit is established through wires 78 and 79, which, coöperating with the starting and stopping circuit 81, in the usual manner, stops the machine. However, if the magazine is present at said time, such stopping circuit will not be established and the machine will continue its normal operations, such mechanism being provided to prevent operation of the machine when no magazines are present in the hopper 47, as will be readily understood by those skilled in this art.

As best shown in Figs. 1 and 18, the feed table 30—30' is equipped with laterally adjustable guides 90 and 91, the guide 91 being provided at its terminus with a spring guide portion 92 adjustable laterally by means of adjusting screws 93, the guides 90 and 91 on the table portion 30' being pivoted respectively at 90' and 91', to the guides on table portion 30.

As best shown in Figs. 1, 13, 14 and 29, a vertically adjustable printing table 95 is arranged at the end of feed table portion 30' and operatively connected therewith by means of a lug or strip 96 loosely engaging a strap 97 on the under side of table 95, so that vertical adjustment of table 95 causes table portion 30' to swing therewith to direct the magazines being fed thereon onto said printing table.

As best shown in Figs. 3, 13 and 14, the table 95 is provided with four depending supporting legs 98, each carrying a threaded rod or stem 99 threaded in the upper end of a hollow internally threaded vertical shaft 100 mounted upon a cross bar 101 in the frame of the machine. The shafts 100 are provided with sprocket wheels 102 engaging a sprocket chain 103 which, in turn, is engaged by a sprocket 104 on the upper end of a vertical shaft 105 provided with a transverse handle pin 106 for manipulating the same. As shown in Fig. 29ª, the table 95 carries a guide pin 95' sliding in a perforation in a lug 95" on the frame of the machine, so as to maintain said table in its true relation to the other parts. By this arrangement, it will be observed that by manipulating shaft 105, in one direction or the other, the table 95 may be nicely adjusted vertically, as desired.

As best shown in Figs. 1, 14 and 29, two endless feed belts or tapes 107, of canvas or the like, are arranged to traverse the top of table 95, said tapes operating through slots 108 adjacent the table portion 30', and slots 109 adjacent the opposite end of table 95. These tapes operate over guide rollers 110 and 111 arranged, as shown, the rollers 111 being mounted upon a drive shaft 112 mounted on the under side of the table 95 and driven by means of a sprocket chain 113 from the shaft 36, as shown, said tapes or belts 107 being arranged to be driven somewhat faster than the speed of chains 33, so as to remove magazines from the domination of said chains and permit of downward movement of the pins 46 through the slots in table portion 30'. Belt tighteners 107' of any usual or desired construction are arranged to coöperate with belts 107 to maintain proper tension thereon. The table 95 is equipped with a stop guide 114 adjustable on table 95 and having idler holding rollers 115 mounted thereon, as best indicated in Figs. 16 and 17. Each of the rollers 115 is carried by a swinging lever 116 pivoted at 117 to a block 118 secured to the stop member 114. The other end of each of the arms 116 is provided with a stop pin 119, coöperating with an adjustable screw 120 in the corresponding block 118, whereby the rollers 115 may be nicely adjusted to accommodate different thicknesses of magazines on table 95. The rollers 115 are formed substantially conically on the side of the approach of the magazines, so that any upwardly projecting edges of said magazines will be directed downwardly into proper position, and the magazines nicely held in snug engagement with the stop guide 114, when fed thereagainst by the frictional action of the tapes 107, as will be readily understood, said rollers 115 preventing rebound of said magazines, or too easy discharge or discharging movement thereof.

At its rear central portion, as best shown in Figs. 1, 2, 15, 23, 24 and 25, the machine is equipped with an upstanding stencil holder or hopper 121 adapted to contain a plurality of ordinary printing stencils perforated to indicate the names and addresses of subscribers for a magazine, or the like, the machine being designed and operating to print these names and addresses uniformly upon the magazines, as will be now made to appear. The stencil hopper or holder 121 is supported on an overhanging bracket 122 secured to a rigid frame portion 123 of the machine and stencil guides 124 are arranged under said hopper, to guide the stencils in a path directly over the corresponding edges of the magazines being fed through the machine. These stencils are automatically fed from the hopper 121 by means of a reciprocating feed plate or head 125, supported on a rearwardly extending arm 126 secured to a reciprocating block 127 reciprocating in guides 128 on the frame of the machine. The block 127 is reciprocated by means of a link 129 connected with the upper end of a rocker arm 130 hinged at 131 to a bracket 132 mounted on the frame of the machine, as best shown in Figs. 2, 14 and 24. Rocker arm 130 is operated by means of a link 133, connected with a crank pin 134 on a disk 135, secured to a shaft 136, mounted in the frame of the machine. Shaft 136 carries a gear 137 meshing with an idler gear 138 which, in turn, meshes with a gear 139 on the shaft 36; whereby shaft 136 will be operated to reciprocate the feed head or plate 125 to feed out the bottommost stencil in the hopper or holder 121, as will be readily understood. As best shown in Figs. 23 and 24, the feed plate 125 is provided with a supporting tongue or lip 140 and with riding ridges or flanges 141 beveled at both ends to facilitate the feed of said stencils. As best shown in Figs. 23 and 26, suitable frictional members 142 are provided on guides 124 for contact with the edges of the stencils being fed, to sufficiently retard the same to effect accurate feeding thereof, as will be readily understood by those skilled in the art, the specific form of stencil-feeding mechanism being old and well known and constituting no part of my present invention, except in so far as the same coöperates with the other parts thereof.

As best shown in Figs. 1, 2, 13 and 27, an inking roller 143 is mounted upon a rocker arm 144 pivoted to the frame of the machine at 145, and rocked by a link 146 connected with a pin 147 on a rocker lever 148 pivoted at 149 on the frame of the machine. Rocker lever 148 is provided, at one end, with a roller 150 running upon the periphery of a cam 151 fixed to the shaft 39, said roller 150 being yieldingly held in contact with said cam 151 by means of a tension spring 148'. The other end of lever 148 is bifurcated to engage a stem 150' telescoping with a companion stem 150" adjustably connected thereto by means of an adjusting screw 151'. At its upper end stem 150' carries a printing block 152 positioned immediately under the inking roller 143 to coöperate therewith, the arrangement being such that upon downward rocking of said inking roller to engage the top of one of the stencils 153 in guides 124, the block 152 is simultaneously raised to force the corresponding magazine upwardly against the bottom of said stencils, thus effecting printing thereof. The parts are so arranged and timed that, as each magazine is brought to position against the stop guide 114, the corresponding stencil is in registration with the printing wheel 143 and the corresponding name and address is thus printed upon the magazine, as will be readily understood. Inking roller 143 is supplied with ink from a distributing roller 154 operated by a belt 155 from a shaft 156 which, in turn, is driven by a belt 157 from a shaft 158 driven by a belt 159 from the main power shaft 39, as best shown in Fig. 5.

As best shown in Figs. 1, 2 and 14, a stencil-receiving hopper or holder 160 is arranged at the discharge end of guides 124, in position to receive the stencils passing therefrom. The hopper 160 is equipped with a vertically movable platform or table 161 supported on a stem 162 from a slide 163 yieldingly supported on a spring 164, the arrangement being such that upon the addition of the stencils to the hopper 160, the weight thereof causes corresponding depression of the platform 161 to accommodate the new stencils.

As best shown in Figs. 1, 2, 14 and 19, two "drop" or feed-out rollers 165 are loosely mounted upon a shaft 166 having its ends squared and loosely resting in slots 167 provided in blocks 168 supported upon overhanging brackets 169 on the frame of the machine. Compression springs 170 are positioned above the squared ends of shafts 166 and the blocks 168 are rendered adjustable by means of screws 171 and clamping screws 172, the arrangement being such that the drop or feed-out rollers 165 may be nicely adjusted for different thicknesses of magaiznes, as will be readily understood. The sides of the rollers 165, toward the direction from which the magazines approach, are substantially conically formed, as indicated, to facilitate the passage of the magazines thereunder, as will be readily understood.

As best shown in Figs. 2, 3, 13, 14 and 15, feed-out rollers 173 are arranged under table 95 to operate through slots 173' therein and coöperate with the rollers 165 to discharge magazines from the printing table. The rollers 173 are fixed to a shaft 174 rotatably mounted in rocker arms 176 on a rocker hub 175 mounted upon a shaft 176' fixed to the bottom of table 95. Hub 175 is provided with a depending rocker arm 177 connected by an adjustable rod 178 with a pin 179 on a rocker lever 180 pivoted at 181 on a supporting bar 182 loosely mounted on shaft 39 and connected by a link 182' with the shaft 176'. Rocker arm 180 is provided with a cam roller 183 running upon the periphery of a cam 184 fixed to shaft 39, the arrangement being such that after each of the magazines is printed with the subscriber's name and address, as outlined above, the rollers 173 are forced upwardly into operative relation with the rollers 165 to effect lateral discharge of the magazine. The rollers 173 are driven by means of a sprocket chain 185 from a shaft 186 on supporting arm 182. Shaft 186 is driven by means of a pinion 187 meshing with an idler 188 mounted upon arm 182 and in turn meshing with a gear 189 on shaft 39, the arrangement being such as to effect constant driving of the rollers 173 notwithstanding the vertical adjustment of table 95.

As best shown in Figs. 1 and 21, a supporting rod 190 is secured to brackets 169 and guide fingers 191 are adjustably secured thereto by means of clamps 191', said guide fingers being arranged to facilitate the discharge of said printed magazines onto a belt or tape conveyer arranged along the front side of the machine, parallel with the direction of feed of the chains 33 but operating in the opposite direction and at much slower speed. This belt or tape conveyer consists of a plurality of endless canvas belts or tapes 192 running over rollers 193 mounted upon shafts 194 and 195 at the oposite ends of the machine, as best shown in Figs. 1, 3 and 21. Shaft 195 is connected, by means of a gear 196, with a pinion 197 on shaft 35 by means of which the belts 192 are driven in the direction of the arrows, as will be readily understood. The belts 192 are arranged to travel along the tops of supporting bars 198, as shown. A guard table 199 is positioned over the reciving end of the tapes 192 and a deflecting plate or guide 200 is mounted thereon to facilitate the feeding of the magazines onto said tapes, the lower inner edge 201 of the plate or guide 200 being laterally inclined, as indicated, to give the magazines an initial lateral feed in the direction of feed of tapes 192. Both the guide plate 200 and the guard plate 199 are adjustably secured in position by means of a clamping bolt 202, as best shown in Figs. 1 and 22. By this arrangement the printed magazines will be fed and discharged upon the belt conveyer 192 in overlapped relation, but with the printed names and addresses thereon exposed so that the operator may readily separate the magazines to correspond with the post-offices to which they are addressed, thus complying with the postal regulations in this regard.

The machine as disclosed is a simple and efficient one for the purpose, operating with great rapidity and accuracy, and arranged to greatly facilitate the proper addressing of magazines, or the like. The arrangement is such that the addresses will be uniformly printed upon the magazines in exactly the same place, and, by adjusting the parts, this position may be varied to escape marring or obliterating any of the fancy or ornamental portions of the cover of said magazine. Moreover, as noted above, the magazines are delivered in overlapped relation, but with the addressed portions exposed, thus greatly facilitating the collection of the same to correspond with the different post-offices. By means of the peculiar arrangement and association of the various parts of the machine, the same may be built and assembled in very compact form occupying but little floor space. It will also be observed that the printing table may be readily adjusted for different thicknesses of magazines without disturbing the printing mechanism, and that all parts coöperating with the printing table are mounted thereon to adjust therewith so that these parts need not be independently adjusted.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A machine of the class described comprising a conveyer; means on one side of said conveyer for feeding articles to be printed thereto; printing mechanism at the end of and coöperating with said conveyer to print articles transported thereby; discharging means arranged to discharge said printed articles on the side of said conveyer opposite said feeding means; and a second conveyer arranged to receive articles from said discharging means and operating substantially parallel and opposite to said first conveyer, substantially as described.

2. A machine of the class described comprising a conveyer; means for feeding articles to be printed thereto; printing mechanism coöperating with said conveyer to print articles transported thereby; and discharging means arranged to discharge said printed articles in overlapping relation with their printed portions exposed, substantially as described.

3. A machine of the class described comprising a conveyer; printing mechanism coöperating with said conveyer to print articles transported thereby; and discharging means arranged to discharge printed articles from said conveyer in overlapping relation with their printed portions exposed, substantially as described.

4. A machine of the class described comprising a conveyer; means on one side of said conveyer for automatically feeding articles to be printed thereto; printing mechanism at the end of and coöperating with said conveyer to print articles transported thereby; discharging means arranged to discharge said printed articles on the side of said conveyer opposite said feeding means; and a second conveyer arranged substantially parallel to and operating in the reverse direction to said first conveyer, said second conveyer being arranged to receive articles from said discharging means and operating at slower speed to receive said articles and transport the same in overlapping relation with their printed portions exposed, substantially as described.

5. A machine of the class described comprising a vertically adjustable table; printing mechanism arranged above said table and coöperating therewith; means for adjusting said table vertically; means for feeding articles to be printed to said table and printing mechanism; and drop or feed-out rollers on said table, substantially as described.

6. A machine of the class described comprising a vertically adjustable table; a vertically swinging approach for said table; printing mechanism arranged above said table and coöperating therewith; means for adjusting said table vertically; means for feeding articles to be printed to said table and printing mechanism; and drop or feed-out rollers on said table, substantially as described.

7. A machine of the class described comprising a vertically adjustable table; printing mechanism arranged above said table and coöperating therewith; means for adjusting said table vertically; means for feeding articles to be printed to said table; means on said table arranged to position said articles properly for printing; and drop or feed-out rollers on said table, substantially as described.

8. A machine of the class described comprising a vertically adjustable table; a vertically swinging approach for said table; printing mechanism arranged above said table and coöperating therewith; means for adjusting said table vertically; means for feeding articles to be printed to said table; means on said table arranged to position said articles properly for printing; and drop or feed-out rollers on said table, substantially as described.

9. A machine of the class described comprising a vertically adjustable table; printing mechanism arranged above said table and coöperating therewith; means for adjusting said table vertically; means for feeding articles to be printed to said table; friction and stop operating means on said table arranged to position said articles properly for printing; and drop or feed-out rollers on said table, substantially as described.

10. A machine of the class described comprising a vertically adjustable table; a vertically swinging approach for said table; printing mechanism arranged above said table and coöperating therewith; means for adjusting said table vertically; means for feeding articles to be printed to said table; friction and stop operating means on said table arranged to position said articles properly for printing; and drop or feed-out rollers on said table, substantially as described.

11. A machine of the class described comprising printing mechanism; drop or feed-out rollers arranged to discharge articles therefrom; and one or more idler holding rollers set with their axes substantially parallel with said drop rollers and substantially conically formed on their sides toward the approach of articles to said printing mechanism, substantially as described.

12. A machine of the class described comprising printing mechanism; a feed table coöperating therewith; a printing table hinged to said feed table and coöperating with said printing mechanism; drop-rollers on said printing table and arranged to discharge printed articles therefrom; and idler rollers on said printing table arranged parallel with said drop rollers, said drop and idler rollers being substantially conically formed on the sides toward the approach of articles to said printing table, substantially as described.

In testimony whereof I have signed my name to this specification in the presence of two subscribing witnesses.

CAREY A. CHESHIRE.

Witnesses:
JOSHUA R. H. POTTS,
HELEN F. LILLIS.

Copies of this patent may be obtained for five cents each, by addressing the "Commissioner of Patents, Washington, D. C."